(12) United States Patent
Bromm et al.

(10) Patent No.: US 8,794,172 B2
(45) Date of Patent: Aug. 5, 2014

(54) TRAFFIC DECLINEATOR BARREL

(75) Inventors: Scott Bromm, Lake Geneva, WI (US); William N. Lechner, Burlington, WI (US); Robert J. Fisch, East Troy, WI (US)

(73) Assignee: Poly-Flex, Inc., Walworth, WI (US)

( * ) Notice: Subject to any disclaimer, the term of this patent is extended or adjusted under 35 U.S.C. 154(b) by 215 days.

(21) Appl. No.: 13/135,776

(22) Filed: Jul. 14, 2011

(65) Prior Publication Data
US 2013/0014693 A1    Jan. 17, 2013

(51) Int. Cl.
*E01F 9/012* (2006.01)
(52) U.S. Cl.
USPC ........................................................ 116/63 P
(58) Field of Classification Search
CPC ........... E01F 9/012; E01F 9/018; E01F 13/02; E01F 15/00
USPC ....... D10/113.3; 116/63 P, 63 C, 63 R; 404/6, 404/9, 10; 40/612; 340/907, 908.1
See application file for complete search history.

(56) References Cited

U.S. PATENT DOCUMENTS

| | | | | |
|---|---|---|---|---|
| 3,561,375 | A | * | 2/1971 | Hammond et al. .......... 108/53.1 |
| 4,256,050 | A | * | 3/1981 | Barnard ...................... 116/63 C |
| 5,201,599 | A | * | 4/1993 | Kulp et al. ....................... 404/6 |
| 6,786,673 | B2 | * | 9/2004 | Kulp et al. ....................... 404/6 |

* cited by examiner

*Primary Examiner* — Daniel S Larkin
*Assistant Examiner* — Irving A Campbell
(74) *Attorney, Agent, or Firm* — D L Tschida

(57) ABSTRACT

A durable, single walled plastic traffic or work area delineator barrel. The single walled barrel is molded in a blow molding operation and handle and base rim flange regions of the barrel in one construction include compressed wall surfaces that define hollow, open-cavity pillars or struts that span between the walls. The pillars are constructed by depressing portions of the walls into contact and thermally bonding the materials together. In another construction corners of the base rim flange include recessed indentations and surface corrugations that are aligned to strengthen the rim flange.

7 Claims, 12 Drawing Sheets

TRAFFIC DECLINEATOR BARREL

BACKGROUND OF THE INVENTION

The present invention relates to traffic delineators and, in particular, to an improved barrel delineator constructed with a single wall and wherein high stress surfaces are strengthened with corrugated indentations or overlapped surfaces that are welded together during molding to form bonded pillars.

A variety of permanent mount and portable devices exist for use in cordoning off work areas and/or controlling the flow of pedestrian and automotive traffic. Road striping, signage, lights, multi-section fence barricades and concrete safety barriers are a few of the most common devices seen daily on any roadway.

Cones, barrels, folding stands and other portable devices are commonly used during short duration road repairs. One or more of these portable devices are typically distributed along a length of roadway to safely direct/re-direct traffic flow in relation to workmen, repair equipment and supply and material handling equipment and trucks. The portable devices readily stack or disassemble for storage and transport to and from the work areas.

Work area barrel-type delineators or drums are commonly used for highway construction and repair projects. Some of such devices are shown at U.S. Pat. Nos. 4,083,033; 5,201,599; 5,722,788; 5,735,632; 6,017,602; and 6,071,037.

Barrels of the type of the present invention are constructed as single walled structures from flexible plastics, such as low density polyethylene plastic. A single wall construction is more economical and provides a desired flexibility. The barrel fastens to a base that separately supports one or more sand bags or tires as ballast. Some bases are constructed of plastic. Other bases are formed from virgin or recycled rubber or are adapted to support other relatively heavy weight ballast devices.

The barrels are hollow and provide an exposed bottom opening. A bottom rim flange or rim piece of the barrel that surrounds the opening is molded to flex and lock to the ballasted base. The configuration of the barrels allows multiple barrels to be stacked or nested inside each other for transport or storage. Handles facilitate un-stacking and distribution of the barrels from a moving vehicle during deployment along a roadway.

The portability of the barrel and exposure to the normal roadway environment subjects the handle and bottom rim flange pieces to significant wear and tear due to the repeated deployment and re-deployment of the barrels as a job progresses or with each new job. A single wall construction reduces barrel cost. The barrel construction must however accommodate the practical necessity that the barrels withstand normal environmental conditions. Periodic impact and deformation from traffic and exposure to environmental conditions (e.g. UV light, wind, snow, cold etc.) particularly affect the useful life of the barrels. The barrels desirably should also exhibit resiliency and return to shape if impacted, run-over, dragged or are blown away.

Ballast devices such as sand bags, tire carcasses or relatively heavy ballast base pieces (e.g. 25 to 40 lbs) support and maintain the barrels in a stationary position through high winds and slipstream drafts that occur from traffic. The greater the speed of adjacent traffic flow or normal ambient winds, the heavier the weight required at the base.

A primary problem with a single walled barrel construction is that cracks and breaking can occur at high stress regions exposed to the most handling, wear and tear, particularly and for example the handle and bottom rim flange. Damage to the flexible bottom rim flange occurs from the frequent flexing that occurs as road crewmen mount the barrel to a ballast base piece. In cold weather the flexing can produce cracks and splits in the barrel sidewalls and base. The setup time and related cost is also frequently extended due to the foregoing difficulties. Detachment of the body of the barrel from the ballast base can also be frustrated if the rim flange is too flexible.

The present invention was developed to provide an improved and more durable single wall, barrel type delineator, although features of the invention can be adapted to other types of delineators. The barrel is molded in a blow molding operation and generally exhibits a single wall construction. In one construction, upper and lower surfaces at corners of the rim flange include corrugated indentations.

In another construction, overlapping surfaces at the handle and rim flange are strengthened with welded or bonded pillar struts. Portions of one or both of the adjoining surfaces are particularly depressed toward each other to form hollow, open-ended cavities or pillars. The depressed surfaces are bonded together at mating contact regions to define pillars or struts that span between the overlapped surfaces. It is to be appreciated a variety of alternative welding techniques can be employed to form the pillars/struts during or after molding as part of the fabrication process. One or both surfaces may also be depressed to desired depths to contact the opposite surface or may merely be broadly compressed into bonded contact. The bonded surfaces, if not initially overlapped, may also be drawn into overlapping relation during the bonding operation.

Bonding or welding can occur in one or more steps during molding or upon ejecting the barrel from the mold and either before or after cooling. Fabrication costs increase however if the bonding occurs after molding whether the barrel warm or cold since it is necessary to separately handle and manipulate the barrel to compress and bond the selected adjoining wall surfaces.

SUMMARY OF THE INVENTION

It is a primary object of the invention to provide an improved or more durable single wall, molded barrel type work area or traffic delineator.

It is further object of the invention to provide a molded barrel type delineator wherein high stress regions of the barrel are reinforced.

It is further object of the invention to provide a blow molded barrel type delineator wherein base rim flange rim regions include corrugated overlapping wall surfaces and/or indentations or recesses at corner regions.

It is further object of the invention to provide a blow molded barrel type delineator wherein handle and/or base flange rim regions, include welded pillars or struts coupling overlapping wall surfaces.

It is further object of the invention to provide a method of constructing a blow molded barrel type delineator wherein moveable core pieces of the mold are manipulated to depress portions of one or both overlapping wall surfaces into contact with each other to bond and define struts or pillars (e.g. generally hollow cylindrical members) that span between the bonded walls to provide rigidity and strength.

It is further object of the invention to provide a method of constructing a blow molded barrel type delineator wherein portions of handle and base rim flange or other selected surfaces are brought into contact with each other during or after molding, while still warm from the mold or upon being reheated, and subjecting the surfaces to a bonding step to weld the surfaces together.

The foregoing objects, advantages and distinctions of the invention are obtained in one presently preferred traffic or work area delineator barrel. The present delineator barrel is constructed to exhibit an improved, durable single wall plastic construction. The barrel is molded in a blow molding operation. In one embodiment, a rim flange at the base of the barrel includes indented or recessed surfaces adjacent upper and lower corrugated surfaces. Collectively, the indentation and corrugations enhance the rigidity of the barrel.

In another embodiment, surface portions of handle and base support regions of the barrel have been modified to include struts, pillars, or open-ended recesses of material that are bonded to adjacent wall surfaces during barrel fabrication. The bonded surfaces can be directly bonded or can form hollow, open-ended depressions or pillar type struts where greater separations exist between the overlapping surfaces. The bonded surfaces span between the walls to maintain a desired separation and enhance the rigidity of the adjoining region of the barrel.

Portions of parallel, opposed single wall surfaces are particularly brought into engaging contact during molding by moveable core pieces. The mold pieces are manipulated to selectively depress one or both of the walls into contact with the opposed overlapping surface and thermally bond the heated materials at the regions of contact. An essentially homogeneous, long-lived weld is produced by performing the welding step during the molding process while the material is hot.

It is to be appreciated the welding step can occur upon ejecting the barrel from the mold and either before or after cooling. It is also to be appreciated the welding operation can be employed to construct and improve other molded plastic devices at a variety of high wear regions peculiar to each device. The configuration, location and numbers of welds or bonds can be varied in relation to the durability required at the device. The wall surfaces may also project at different angles relative to each other versus being generally parallel. Other delineator devices such as traffic cones etc. can be strengthened by depressing overlapping wall surfaces to compress the walls together and bond the contacting surfaces. A variety of other molded devices can also benefit from the invention.

Still other objects, advantages, distinctions and constructions and combinations of features of the invention will become more apparent from the following description with respect to the appended drawings. Similar components and assemblies are referred to in the various drawings with similar alphanumeric reference characters. The description to each combination or method of construction should therefore not be literally construed in limitation of the invention. Rather, the invention should be interpreted within the broad scope of the further appended claims.

DESCRIPTION OF THE PREFERRED EMBODIMENTS

Figure 1:
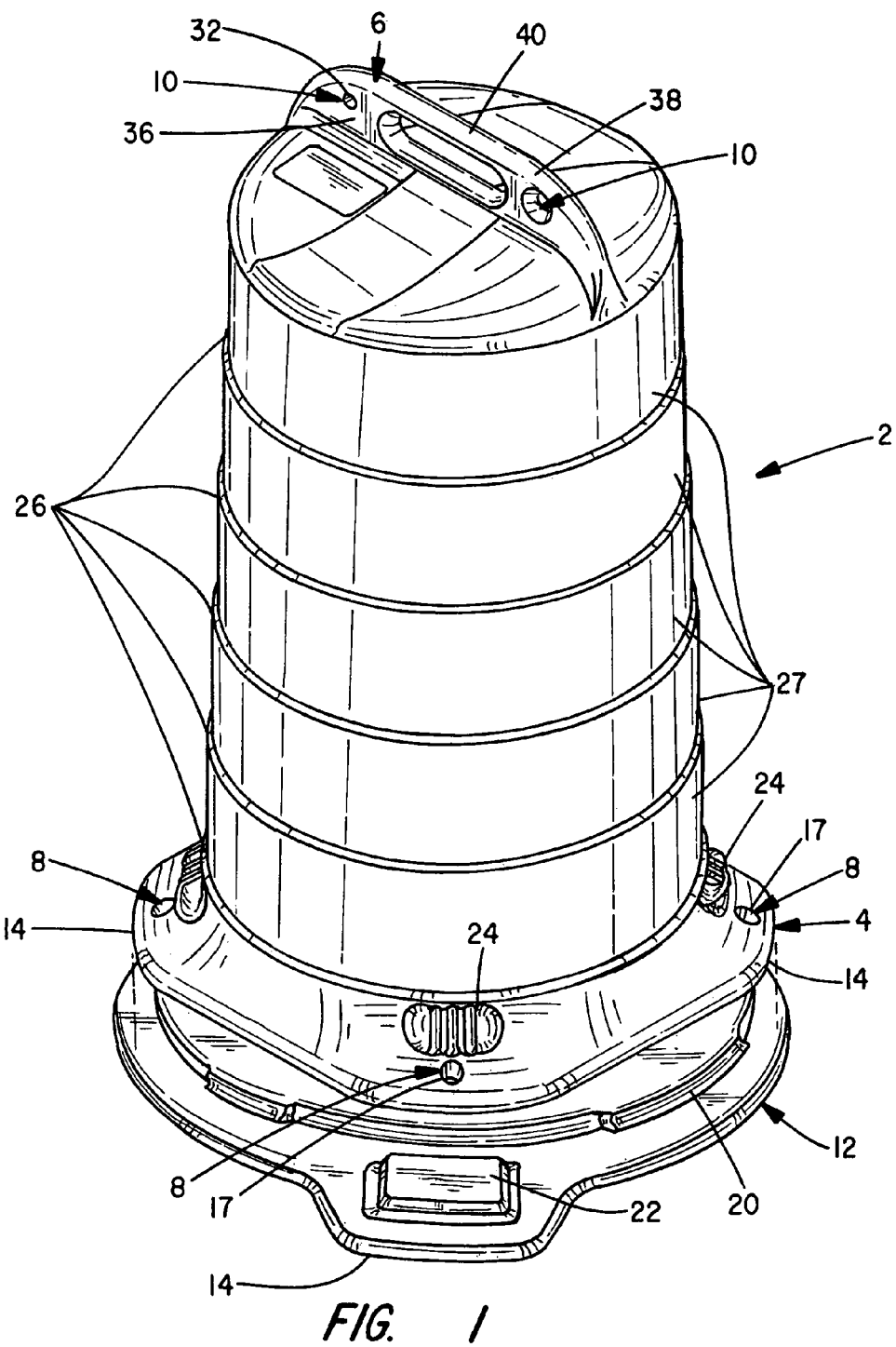
FIG. 1 shows a perspective drawing to a barrel delineator of the invention in exploded assembly relative to a lower lying ballast base support that attaches to the delineator, such as a heavy weight plastic or rubber base and which can further support a sand bag inside the barrel or tire carcass mounted around or inside the barrel.
Figure 2:
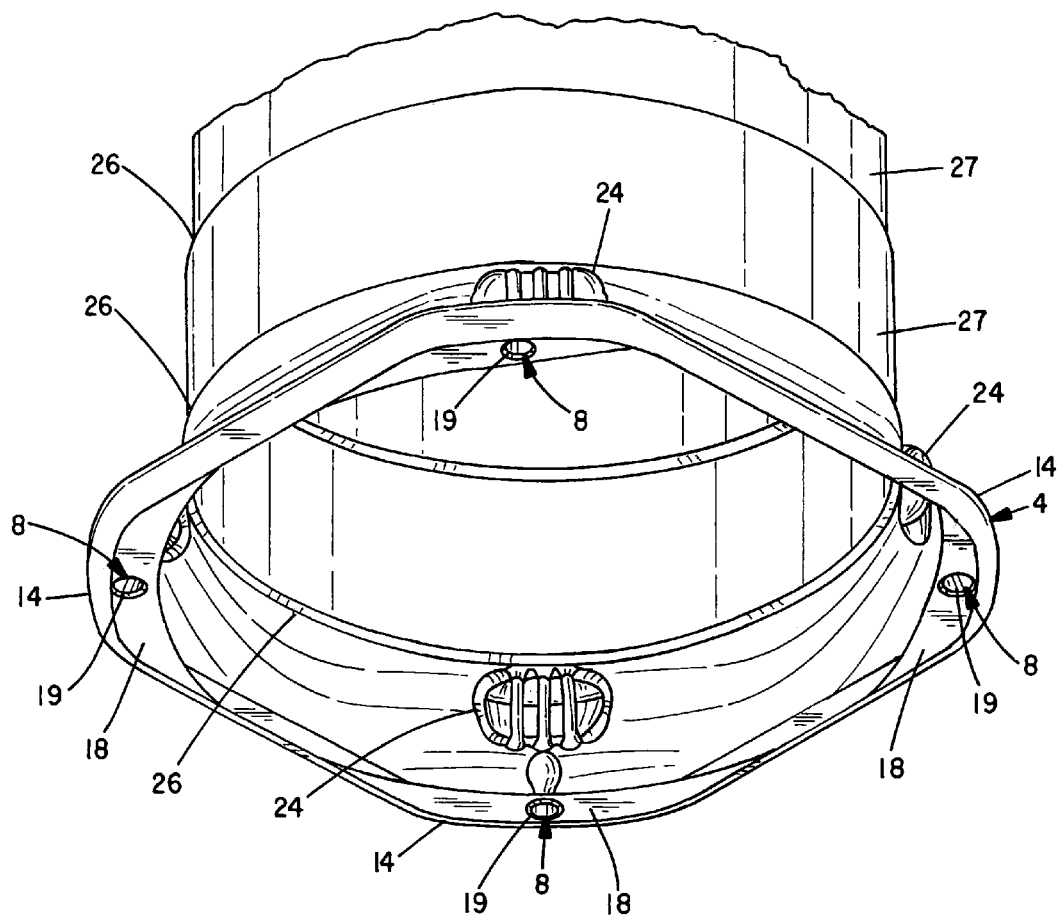
FIG. 2 shows a partially sectioned perspective view to the barrel's rim flange tipped back slightly to expose several bonded, hollow, open ended struts or pillars that span between bonded portions of overlapped opposing surfaces of the improved flexible bottom rim flange.
Figure 3:
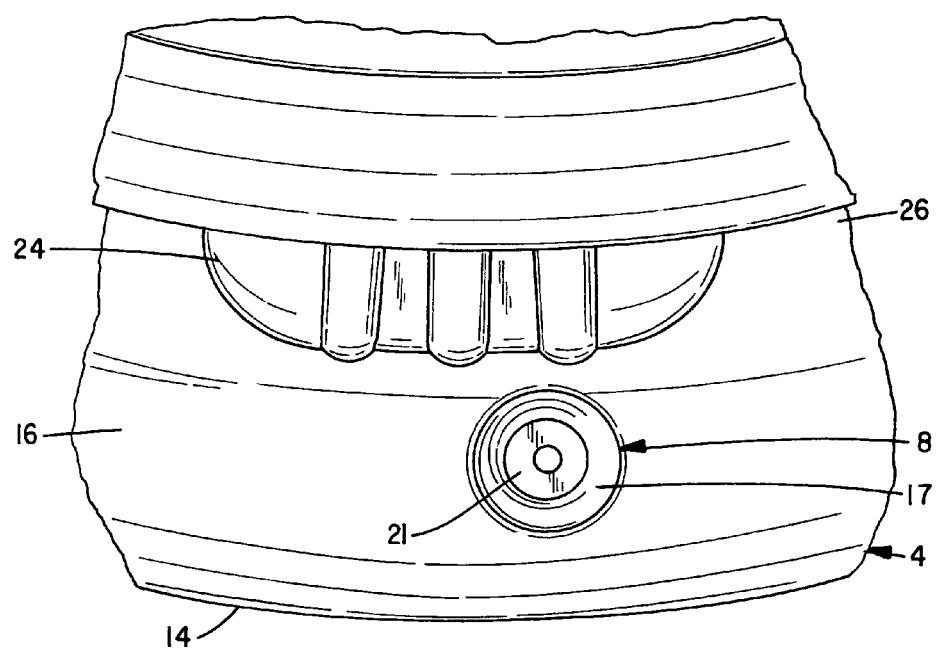
FIG. 3 shows a top plan view to a portion of the barrel's rim flange exposing depressed, tapered sidewalls of one pillar strut and the hollow, open-ended cavity space.
Figure 4:
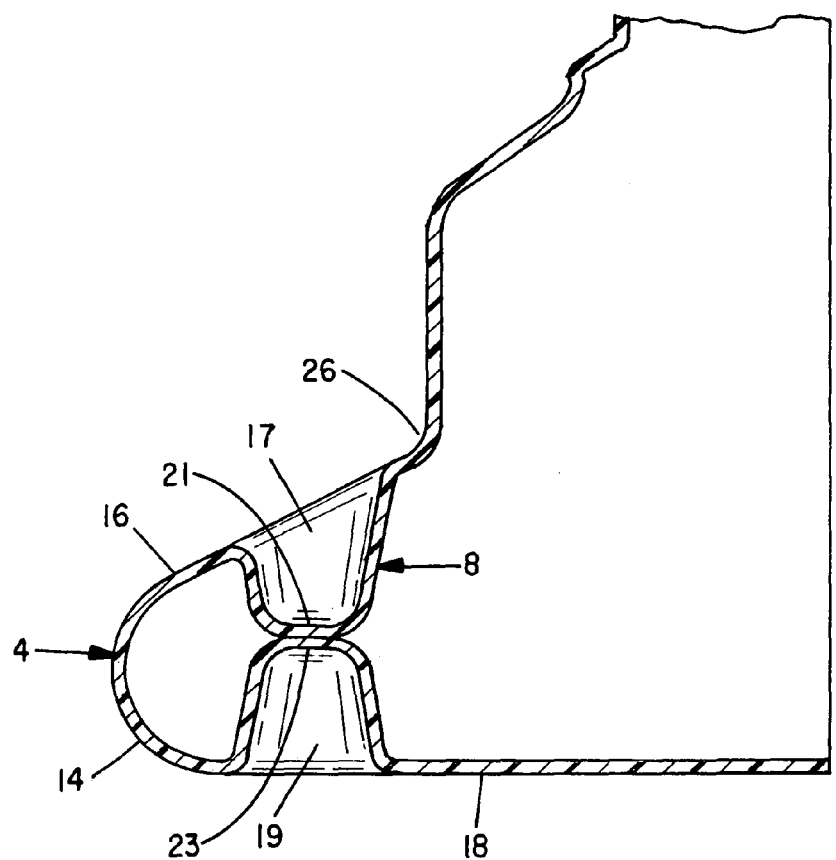
FIG. 4 shows a vertical cross section view taken through a pillar strut at the barrel's rim flange and wherein opposed upper and lower surfaces are depressed equally and bonded together approximately mid-way between the space separating the surfaces.
Figure 5:
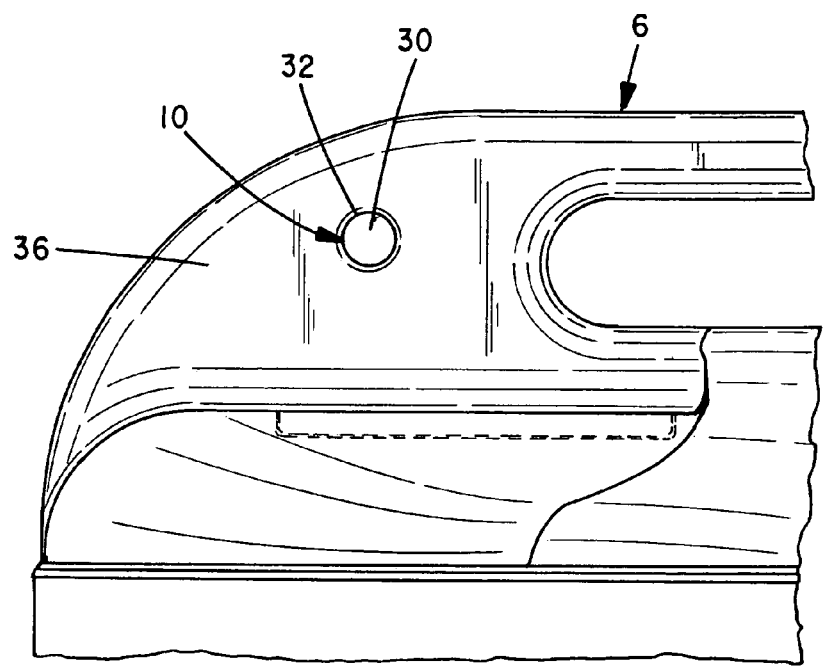
FIG. 5 shows a front plan view to a portion of the barrel handle at an open bore pillar strut that spans between opposite surfaces of the handle.
Figure 6:
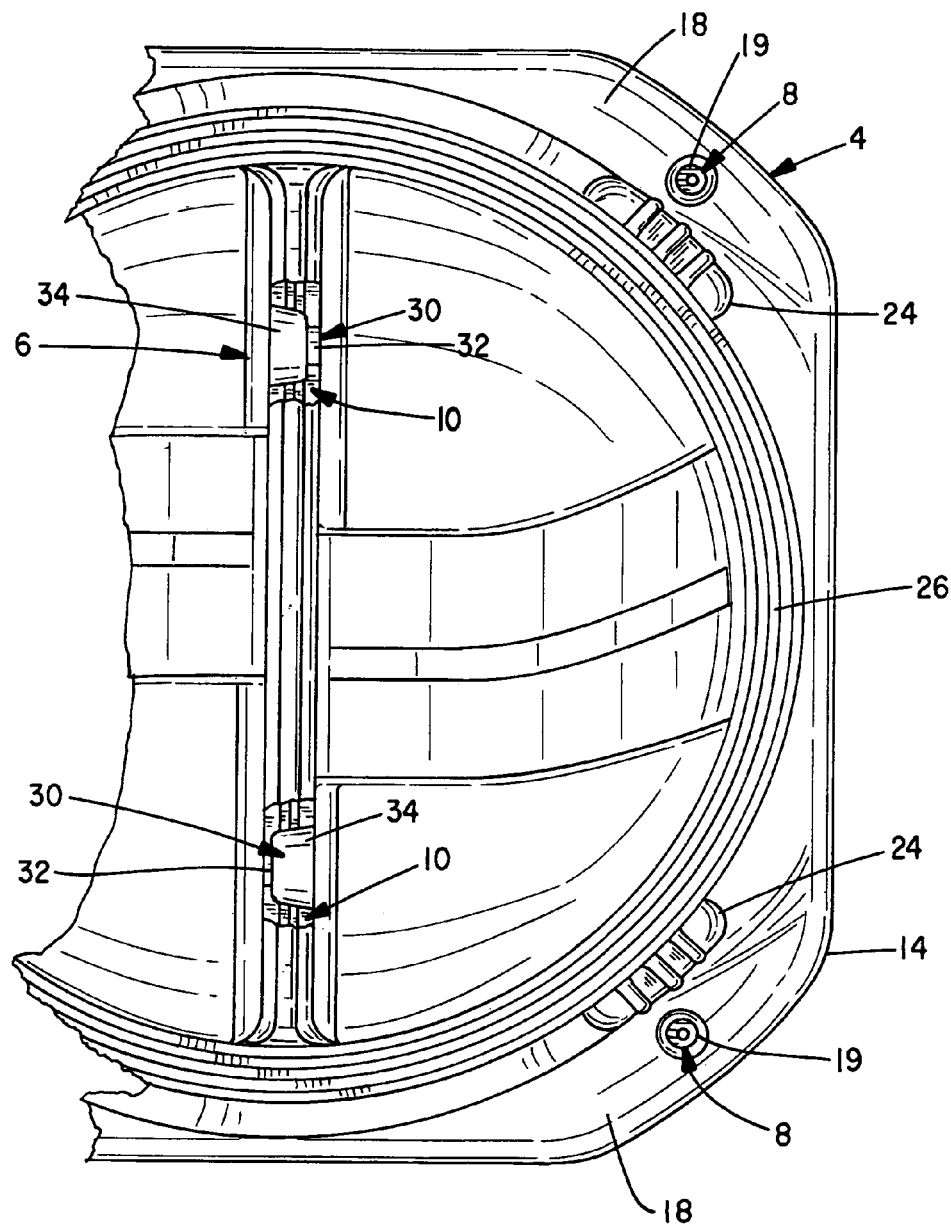
FIG. 6 shows a bottom plan view of the barrel in partial section exposing the interior of the open bore struts in the handle region and wherein only one of the opposed wall surfaces is depressed to contact the opposite surface and shaped to include an open bore, along with open ended pillar struts at the base rim flange.
Figure 7:
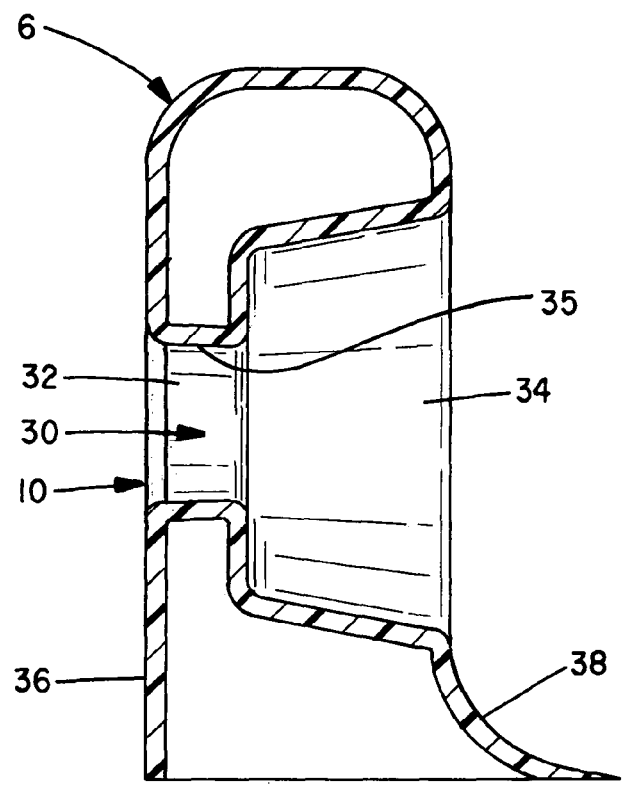
FIG. 7 shows a detailed cross section view through a pillar strut of the barrel handle and wherein a portion of the depressed wall surface is removed after bonding to define a through bore.
Figure 8:
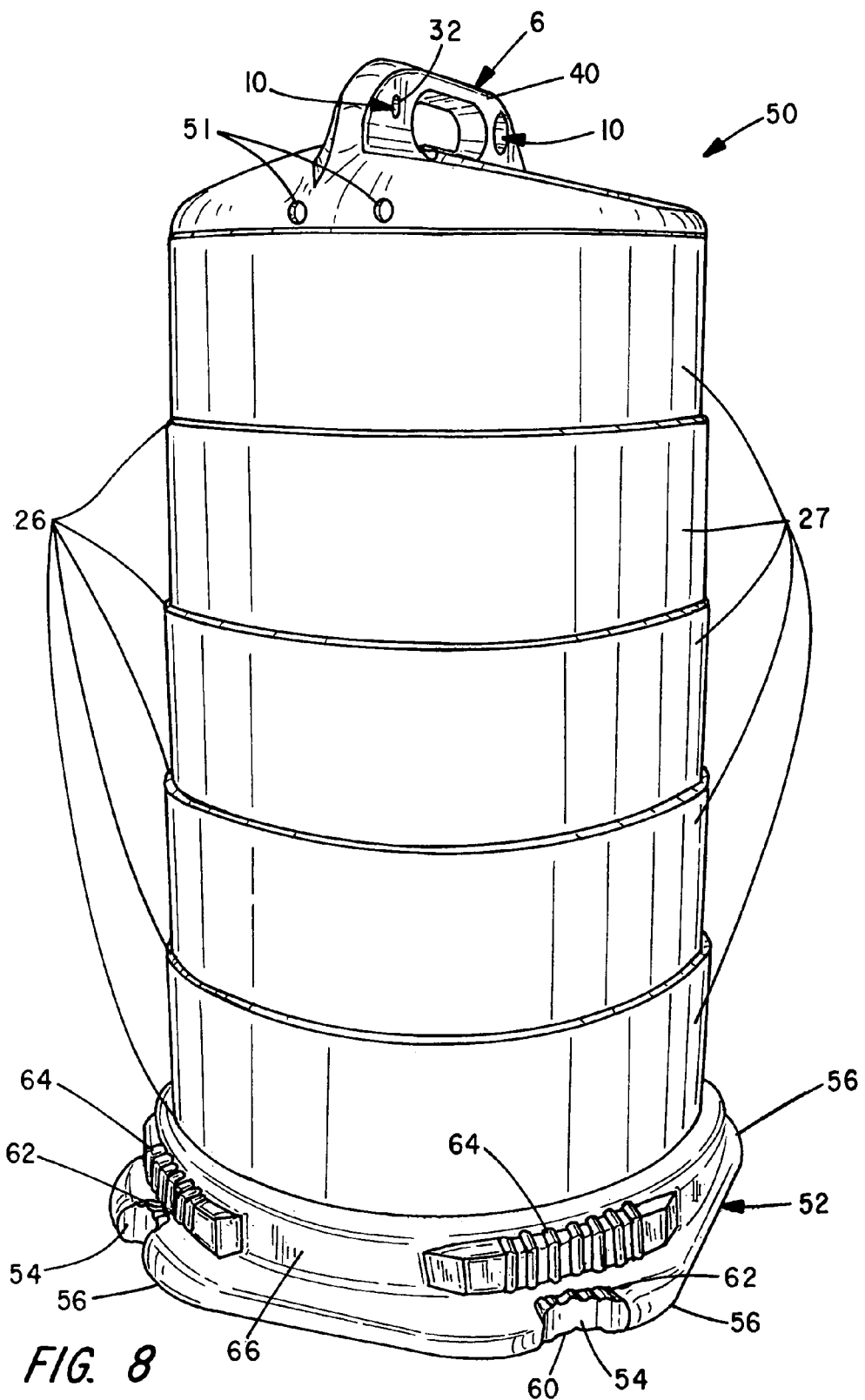
FIG. 8 shows a perspective drawing to an alternative embodiment of a barrel delineator of the invention wherein a base rim flange includes indented recesses at flange corners and wherein corrugations are formed in upper and lower surfaces of the flange and regions adjoining the rim flange.
Figure 9:
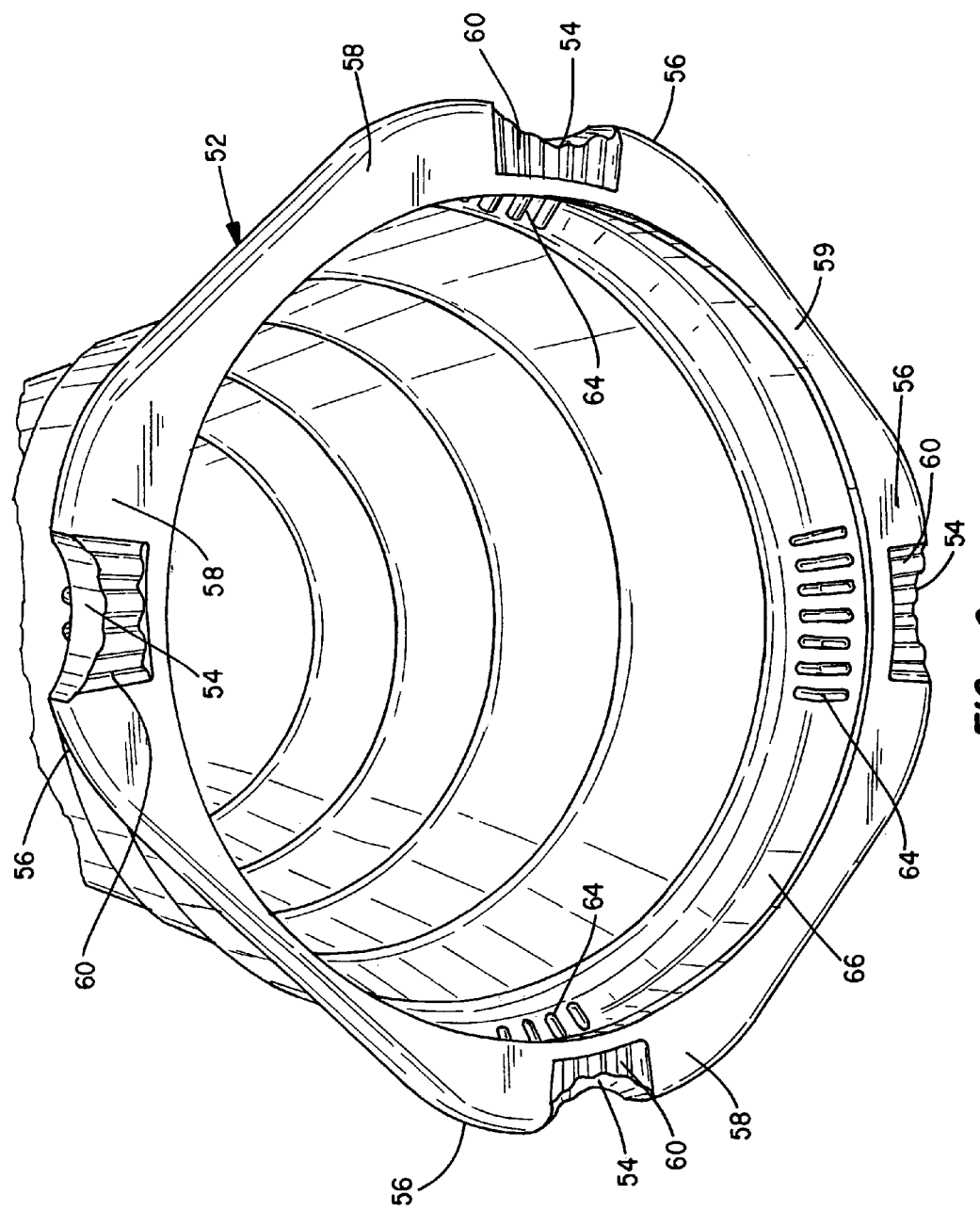
FIG. 9 shows a partially sectioned perspective view to the rim flange of the barrel of FIG. 8 tipped back slightly to expose details to the several corrugated indentations at the corners of the bottom rim flange.
Figure 10:
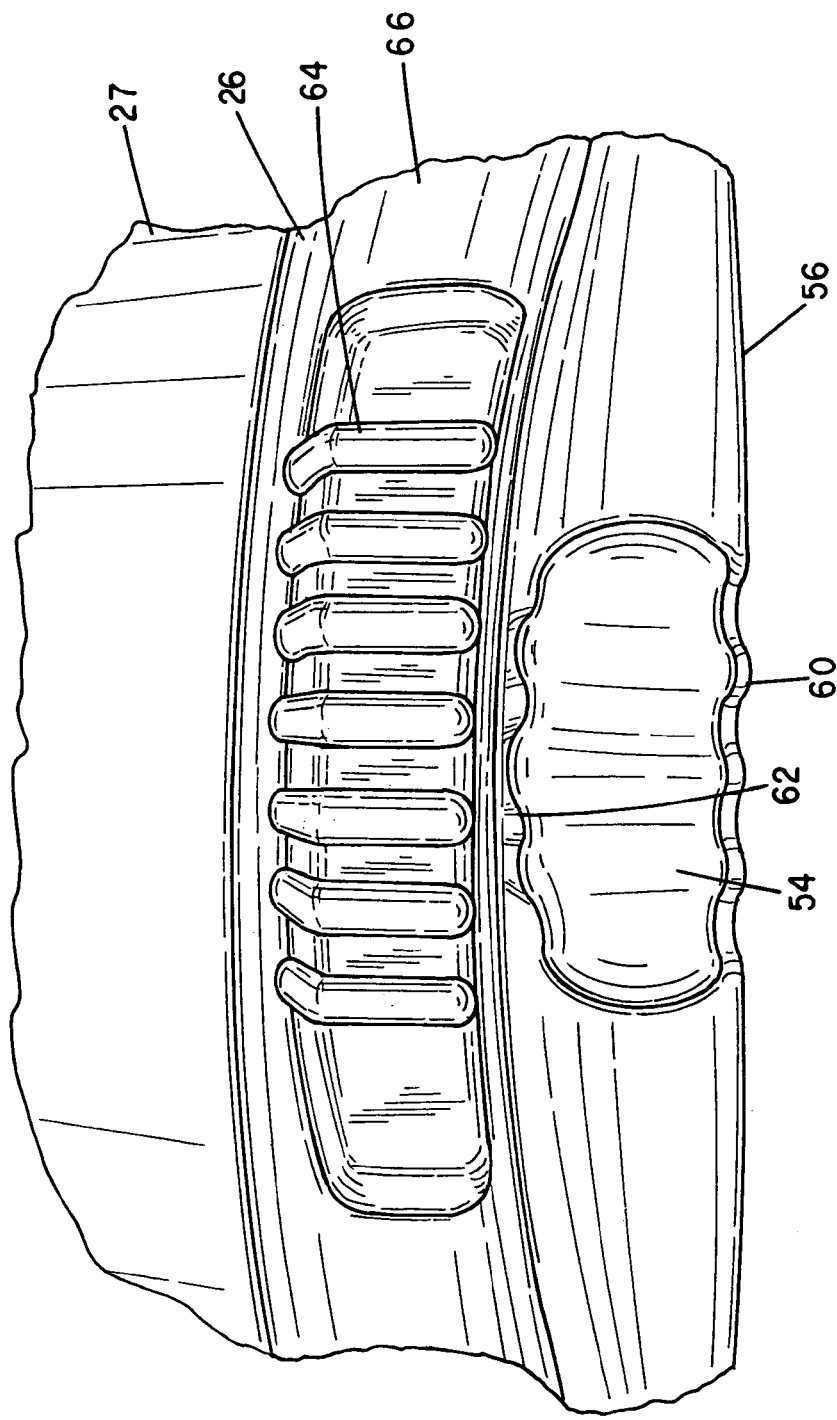
FIG. 10 shows a detailed plan view in enlarged scale to the upper and lower surface corrugations and indentation at one corner to the base rim flange of the barrel of FIG. 9.
Figure 11:
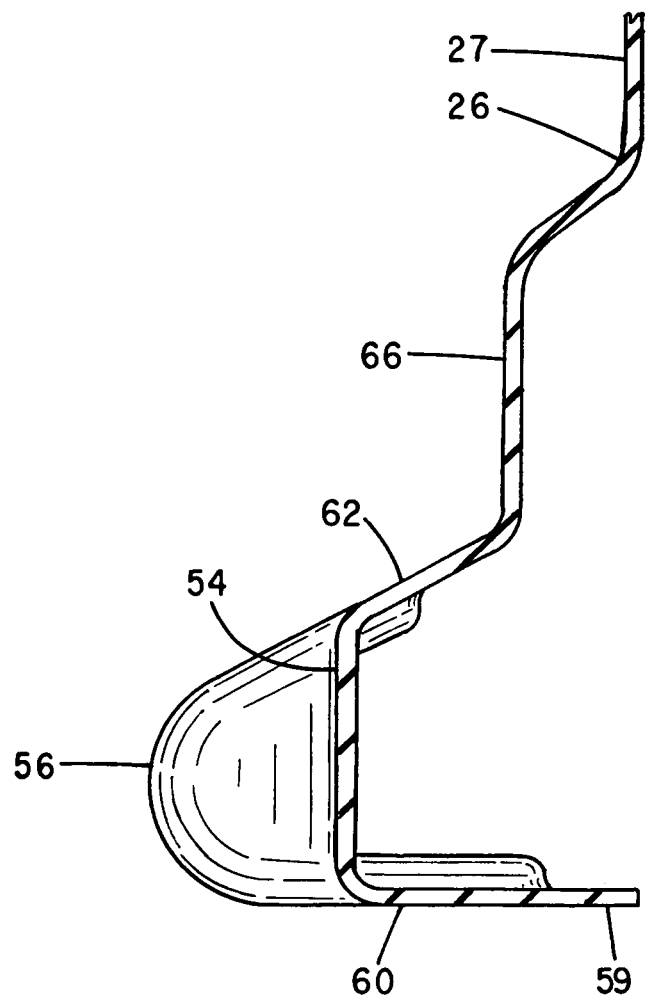
FIG. 11 shows a vertical cross section view taken through the recessed indentation of one corner of the barrel's rim flange.
Figure 12:
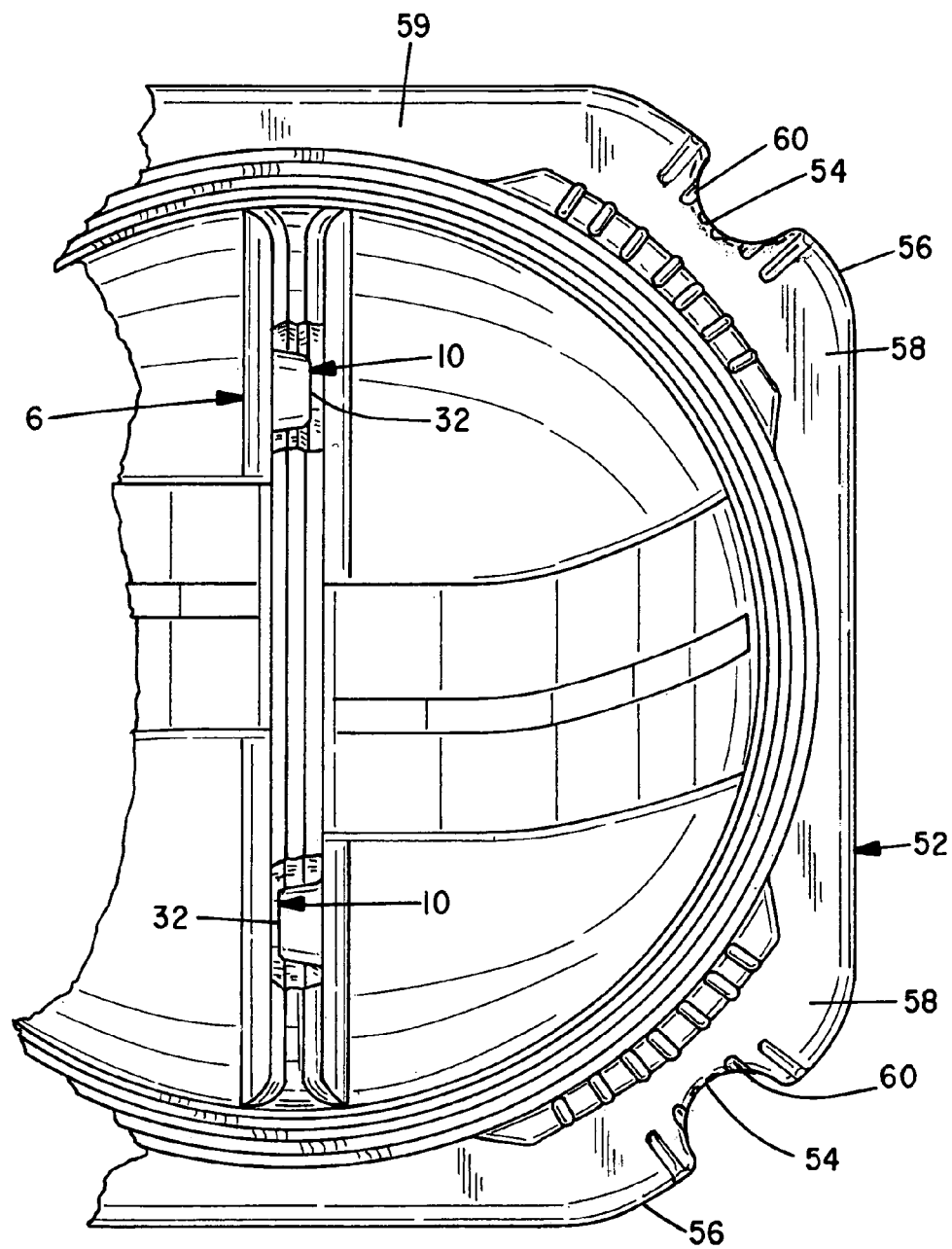
FIG. 12 shows a bottom plan view of the barrel of FIG. 8 exposing in partial section the interior of open bore struts in the handle region and wherein only one of the opposed wall surfaces is depressed to contact the opposite surface and shaped to include an open bore, along with the corrugated indentations at two of the corners of the base rim flange.

With attention to FIG. 1 a perspective view is shown to an improved traffic or work area delineator or barrel 2 of the invention. FIGS. 2 through 4 depict views to improvements to a base rim flange or skirt portion 4 of the barrel 2. FIGS. 5 through 7 depict views to improvements to a handle portion 6. The base flange and handle portions 4 and 6 each particularly include hollow, open ended struts or generally tubular pillars 8 and 10 that span between opposed or adjoining wall surfaces at regions exposed to high wear and tear. The pillars 8 and 10 strengthen the barrel 2 and maintain a desired separation between the mated wall surfaces.

The pillars 8 and 10 are formed from overlapping or generally parallel opposed walls surfaces that are depressed together and joined such as by thermal bonding or other welding methods. A hollow open-ended cavity is thus formed at each depressed wall surface. The locations of the pillars 8 and 10 are judiciously selected relative to points of high wear or abuse. The welded composite structures of the base rim flange 4 and handle 6 exhibit improved rigidity and strength that prolong the useful life of the barrel 2.

The pillars 8 are included at the base rim flange 4 to stabilize the relatively flexible and generally parallel upper and lower single wall surfaces of the flange 4 during attachment and detachment from a relatively heavy weight ballast base 12. The ballast base 12 is available from a variety of other vendors and can exhibit a variety of appearances. Functionally the ballast base 12 is either constructed from a relatively heavy weight material (e.g. rubber) or is filled with or supports other ballasting material. Sand bags and prepared carcasses of discarded tires are some examples of common ballasting material. The ballasting materials can be supported on the base inside the barrel 2 or over the rim flange 4. The ballast base 12 can also be hollow and can be constructed to contain sand, water or other ballasting materials.

From the foregoing views of FIGS. 1 through 4, the base rim flange 4 at each corner 14 includes an upper wall surface 16 that overlies a lower web or gusset piece 18. The web pieces 18 form a gusset that spans the underside of each corner 14 and the transverse intersecting sidewall regions. The gusset pieces 18 control lateral horizontal distortion of the corners 14, yet allow the corners 14 to flex and mount between and/or over mating, raised retainer or fastener pieces 20 and 22 at the ballast base 12. The base rim flange 4 thus secures and interlocks the upright delineator barrel 2 to the base 12. Sand bags can be draped over the corners 14 or be mounted out-of-sight upon positioning the bags on top of the base 12 and inside the delineator barrel 2.

Although the rim flange of prior art delineators provided some rigidity for nominally sized barrels exhibiting a 2 foot diameter and 3 to 3½ foot height, under exposure to heavy winds or during setup and/or mounting of the base ballast piece 12, the gussets or web pieces 18 frequently flex at the corners 14 and release from the ballast base 12.

The improved barrel delineator 2 of the invention is strengthened and exhibits less base piece and handle flexion with open ended struts and pillars that are formed at high stress regions. The corners of base rim flanges of the delineators 2 are strengthened by particularly drawing or depressing a portion of each gusset piece 18 and the opposed upper wall surface 16 into contact with each other and bonding the mating surfaces together to form of a hollow pillar type strut 8, reference FIG. 4.

Hollow, back-to-back recesses or depressions 17 and 19 define the struts or pillars 8. The pillars 8 are particularly formed and bonded together approximately mid-way between the corner surfaces 16 and 18 at contacting surfaces 21 and 23. The corners 14 of the rim flange 4 are thereby braced and strengthened to provide a stiffer structure more resistant to torsion or flexion forces. The pillar type struts 8 also maintain a desired separation of the wall surfaces 16 and 18 that facilitates mounting to the base fasteners 20 and 22 of a ballast base 12.

Although the joined walls 16 and 18 are generally parallel, the walls and formed pillars can project at a wide variety of different angles relative to each other. The joined wall surfaces may also be re-directed and displaced during bonding to contact each other. The pillars may project between flat or contoured surfaces to provide any desired axial support provided the molds permit the desired alignments.

The strength of each corner 14 is also enhanced by providing regions of raised ridges and grooves or corrugations or scalloping 24 in close association to the pillar struts 8. The scalloping 24 in the barrel sidewalls is primarily provided to interact with tire carcass ballasts that might be mounted over the delineator 2 to prevent rotation of the ballast tire. The ridges and grooves of the corrugated scalloping 24 however also stabilize the corners 14 from undue flexion relative to the lower most annular ridge 26 that circumscribes the base rim flange 4 at the juncture with an adjoining, generally cylindrical sidewall band 27. Alternating ridges 26 and bands 27 circumscribe the barrel 2 as the side walls tapers upward to the handle 6.

Appreciating the structural improvements achieved with the hollow, generally tubular corner pillar type struts 8, similar hollow struts 10 are provided at the handle 4 as shown at FIGS. 5 through 7. Where the pillar struts 8 comprise depressed, back-to-back portions 17 and 19 of the rim flange walls 16 and 18 that are bonded together at intermediate mating contact regions, the pillars 10 provide through bores 30 formed in a concentric depression. Each bore 30 has a center aperture region 32 of lesser diameter than an adjoining, larger diameter recessed concentric region 34. That is, portions of one wall of each of the opposite front and rear walls 36 and 38 of the handle 4 are depressed and compressed against the opposite wall to form a depression 34. A portion of the recessed wall at the mating surfaces with the opposite wall is removed during fabrication to form an aperture 32 and the through bore 30.

In particular and upon depressing a portion of the wall 38 to form the depression 34, portions of the sidewall surfaces 35 of the inner bore 32 are bonded to the opposite wall 36 to form the pillar 10 shown at FIGS. 5-7. Another pillar 10 is formed by depressing a portion of the wall 36 into contact with the wall 38 and removing the center region of the bore 30. The pinching together of the surfaces 36 and 38 forms hollow, generally tubular, cylindrical struts 10 to either side of an open hand grip space 40. The pillars 10 stabilize the handle 4 against flexion and enhance the general strength of the handle 4.

The pillar type struts 8 and 10 are presently formed during the molding of the barrel 2 in a blow molding process. Mold pins at the mold halves, not shown, are judiciously actuated during appropriate mold cycle times to suitably compress the wall surfaces 16 and 18 and 36 and 38 into contact with each other. A bond or weld between the depressed and/or compressed surfaces at the hollow pillars or struts 8 and 10 is created as the mated hot or warm plastic material is held under a controlled pressure.

The plastic wall materials coalesce and merge during bonding to form an essentially homogenous bond or weld. Depending upon the location of the wall surfaces to be welded, dedicated pins may be used. Alternatively, ejector pins used to eject the barrel 2 from the mold might be suitably employed to form the desired thermal weld or other suitable bond prior to ejecting the barrel 2 from the mold. Bonded material at the weld can be cutaway after molding such as in the fashion of the forming of the through bores 32 at the pillar struts 10, along with other flashed material.

Although it is presently preferred that the barrel material be warm during bonding, the bonding and forming of the open and closed-ended pillar struts 10 and 8 can be performed upon releasing the barrel 2 from the mold. In this instance the material can initially be either warm or cold. Heat is however normally applied to facilitate forming and prior to bonding to assure the integrity of the bond or weld. Preferably, any bonding appliance used after molding should be able to sufficiently compress and heat the materials to produce a coalescence of materials. The shape of the pillar type struts 8 and 10 are presently tubular or cylindrical with a slight tapering at the sidewalls to facilitate molding pin movement, although any other desired tubular sidewall shape can be created (e.g. hexagonal, square, rectangular, oblong, torx, star etc.).

As noted with the pillar struts 10 only one of the wall surfaces 16 and 18 and/or 36 and 38 is compressed into contact with the other wall. The bore sidewalls then extend full depth to the opposite wall surface versus the partial hollow cavity spaces 17 and 19 at the base flange pillar struts 8.

It is to be appreciated the bonded surface regions might also exhibit solid coalesced surfaces of any desired geometry whether the same as the bore shape or not. The bond might also possibly exhibit an annular configuration such as concentric or overlapping welded rings (e.g. figure eight shape) that surround un-bonded adjacent surface regions.

Turning attention to FIGS. 8 through 12, views are shown to an alternative construction of a delineator barrel 50. The barrel 50 is blow molded and exhibits a generally similar construction to the barrel 2. A handle 6 projects from a top surface and pillars 10 are formed between front and rear walls to either side of a hand grip space 40. Air vent or drain apertures 51 extend through the side walls of the delineator 50 at each end of the handle 6. A succession of vertically tapering side wall sections 27 depend from the top wall to intermittent ridges 26 as the side wall sections 27 flare outward and extend to a base rim flange 52.

In lieu of open cavity pillars or struts 8 at the base rim flange 52, the base rim flange 52 is strengthened with recessed indentations 54 and adjoining corrugated surfaces at each of four corners 56. A gusset portion 58 of a bottom wall 59 spans each corner 56 and includes a corrugated surface 60 that adjoins each indentation 54. An upper corrugated wall surface 62 of the rim flange 52 extends inward from each indentation 54 and aligns with and partially spans the width of a raised corrugated band 64 that projects from a vertical band portion 66 of the barrel side wall. Collectively the indentations 54, corrugated upper and lower surfaces 62 and 60 and corrugated bands 64 stabilize the base rim flange 52 and each corner 56 and bottom wall gusset 58.

The indentations 54 and corrugated surfaces 60, 62 and 64 are readily formed. The ridges and valleys of the corrugated surfaces stabilize each corner 56 and the bottom wall 59 vertically and horizontally to resist the normal environmental conditions, handling and road conditions to which the delineator 50 is subjected.

While the invention has been described with respect to presently preferred alternative constructions of barrel type delineators and considered improvements or alternatives thereto, still other work area and traffic delineators may be suggested to those skilled in the art that would benefit from the inclusion of the pillared struts and other improvements of the invention. It is also to be appreciated that the features of the foregoing delineators can be arranged in different combinations and constructions. The foregoing description should therefore be construed to include all those embodiments within the spirit and scope of the following claims.

What is claimed is:

1. A traffic delineator comprising:
   a barrel comprised of a single thickness material and having a top wall, a side wall that vertically depends from said top wall and exhibits a tubular shape, and an integral rim flange that radiates concentrically outward from a bottom end of said side wall, wherein said rim flange includes a plurality of corners, wherein said rim flange includes i) an upper wall piece that flares outward from the bottom end of said side wall, ii) a bottom wall piece that underlies said upper wall piece and radiates inward beneath said upper wall piece and iii) a vertical wall piece having a plurality of generally straight portions arranged to concentrically circumscribe said side wall and interconnect said upper and bottom wall pieces and wherein said plurality of corners are defined at intersecting regions of said straight portions, wherein each of said upper and bottom wall pieces at each corner include a plurality of opposed corrugated raised ridges and intermediate valleys, wherein the vertical wall piece at a plurality said corners extends arcuately inward between the intersecting straight portions of the vertical wall piece to define an indented recess, and wherein an open hollow cavity space is exposed through said bottom wall piece of said rim flange and circumscribed by said top and side walls and said rim flange.

2. A traffic delineator as set forth in claim 1 wherein said side wall includes a plurality of corrugated surface bands having a plurality of raised ridges and intermediate valleys that project from said side wall radially adjacent each corner.

3. A traffic delineator as set forth in claim 1 wherein the upper wall piece and underlying bottom wall piece at each corner are displaced apart by a vertical tubular pillar exhibiting an open through bore.

4. A traffic delineator comprising:
   a barrel comprised of a single thickness material and having a top wall, a side wall that vertically depends from said top wall and exhibits a tubular shape, and an integral rim flange that radiates outward from a bottom end of said side wall, wherein said rim flange includes i) an upper wall piece that flares outward from the bottom end of said side wall, ii) a bottom wall piece that underlies said upper wall piece and radiates inward beneath said upper wall piece and iii) a vertical wall piece having a plurality of generally straight portions arranged to circumscribe said rim flange and interconnect said upper and bottom wall pieces and wherein a plurality of corners are defined at intersecting regions of said straight portions, wherein each of said upper and bottom wall pieces at at least one corner each include a plurality of corrugated raised ridges and intermediate valleys, wherein the intersecting straight portions of the vertical wall piece at at least one corner radially extend inward to define an indented recess, and wherein an open hollow cavity space is exposed through said bottom wall piece of said rim flange and circumscribed by said top and side walls and said rim flange.

5. A traffic delineator as set forth in claim 4 wherein said side wall includes a plurality of corrugated surface bands having a plurality of raised ridges and intermediate valleys that project from said side wall radially adjacent each corner.

6. A traffic delineator as set forth in claim 4 wherein the upper wall piece and underlying bottom wall piece at each corner are displaced apart by a vertical tubular pillar exhibiting an open through bore.

7. A traffic delineator comprising:
   a barrel comprised of a single thickness material and having a top wall, a side wall that vertically depends and tapers outward from said top wall to exhibit a tubular conical shape, and an integral rim flange that concentrically radiates outward from a bottom end of said side wall, wherein said rim flange includes i) an upper wall piece that flares outward from the bottom end of said side wall, ii) a bottom wall piece that underlies said upper wall piece and radiates inward beneath said upper wall piece, and iii) a vertical wall piece having a plurality of generally straight portions arranged to concentrically circumscribe said side wall and said rim flange and interconnect said upper and bottom wall pieces and wherein a plurality of corners are defined at intersecting regions of said straight portions, wherein said upper and bottom wall pieces at each corner each include a plurality of corrugated raised ridges and intermediate valleys, wherein the intersecting straight portions of the vertical wall piece at each corner radially extend inward to define an indented recess, wherein an open hollow cavity space is exposed through said bottom wall piece of said rim flange and circumscribed by said top and side walls and said rim flange, and wherein a portion of said side wall radially opposed to each corner and indented recess includes a plurality of raised ridges and intermediate valleys that extend vertically along said sidewall.

* * * * *